United States Patent [19]

Nagasawa et al.

[11] Patent Number: 5,091,878
[45] Date of Patent: Feb. 25, 1992

[54] WORD PROCESSING APPARATUS

[75] Inventors: Hiroyuki Nagasawa, Nara; Jun Inoue, Shiga; Katsunori Takeda, Nara; Keizo Saito, Souraku; Hiroko Murai, Yamatokoriyama, all of Japan

[73] Assignee: Sharp Kabushiki Kaisha, Osaka, Japan

[21] Appl. No.: 268,566

[22] Filed: Nov. 8, 1988

[30] Foreign Application Priority Data

| Nov. 9, 1987 | [JP] | Japan | 62-282730 |
| Nov. 30, 1987 | [JP] | Japan | 62-303790 |
| Nov. 30, 1987 | [JP] | Japan | 62-303791 |
| Nov. 30, 1987 | [JP] | Japan | 62-303792 |

[51] Int. Cl.$^5$ .............. G06F 12/04; G06F 12/12
[52] U.S. Cl. ............... 364/419; 364/927; 364/928; 364/928.1; 364/928.2; 364/943; 364/943.1; 364/943.2; 364/943.43; 364/957.8; 364/957.8; 364/957.5; 364/961.1; 364/962; 364/962.1; 364/962.2; 364/963; 364/973; 364/DIG. 2
[58] Field of Search ............ 364/200, 900, 419

[56] References Cited

U.S. PATENT DOCUMENTS

| 3,980,994 | 9/1976 | Ying et al. | 364/200 |
| 4,085,445 | 4/1978 | Blevins et al. | |
| 4,194,197 | 3/1980 | Bodin | 364/900 |
| 4,202,041 | 5/1980 | Kaplow et al. | 364/900 |
| 4,247,906 | 6/1981 | Corwin et al. | 364/900 |
| 4,498,147 | 2/1985 | Agnew et al. | 364/900 |
| 4,862,410 | 8/1989 | Fukunaga | 364/900 |
| 4,868,779 | 9/1989 | Seto | 364/900 |
| 4,881,197 | 11/1989 | Fischer | 364/900 |
| 4,912,669 | 3/1990 | Iwamoto et al. | 364/900 |
| 4,984,162 | 1/1991 | Torii et al. | 364/518 |

FOREIGN PATENT DOCUMENTS

52-149981 6/1971 Japan .

OTHER PUBLICATIONS

Lisa Draw (Apple Computer Inc.) 1983, 1984 pertinent pp. 89–95, 125, 126.

*Primary Examiner*—Michael R. Fleming
*Assistant Examiner*—Ayaz R. Sheikh

[57] ABSTRACT

A word processor may be used in a plurality of languages such as Japanese and English. The word processor has a function of replacing a particular symbol added with an editing symbol with a described character in automatic editing text. The capability of adding of the preferred edit data (edit symbol) to a series of particular symbols is done by arranging newly inputted data in positions of the particular symbols so that the desired edit can be performed. Where a number of newly inputted characters is smaller than that of the particular symbols, they are replaced with space codes or they are deleted. This prevents unnecessary symbols or spaces from remaining in a simplified format.

6 Claims, 5 Drawing Sheets

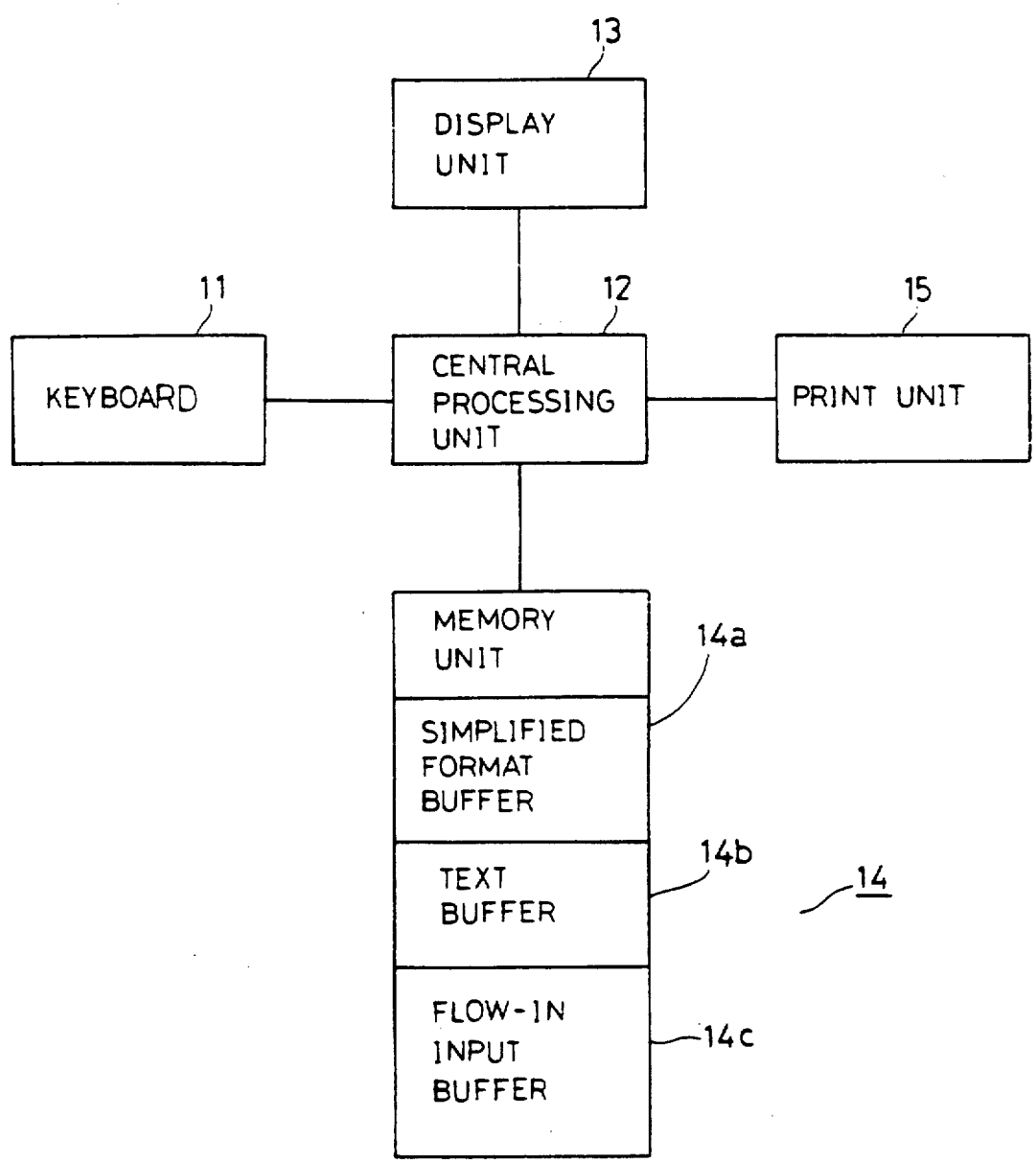

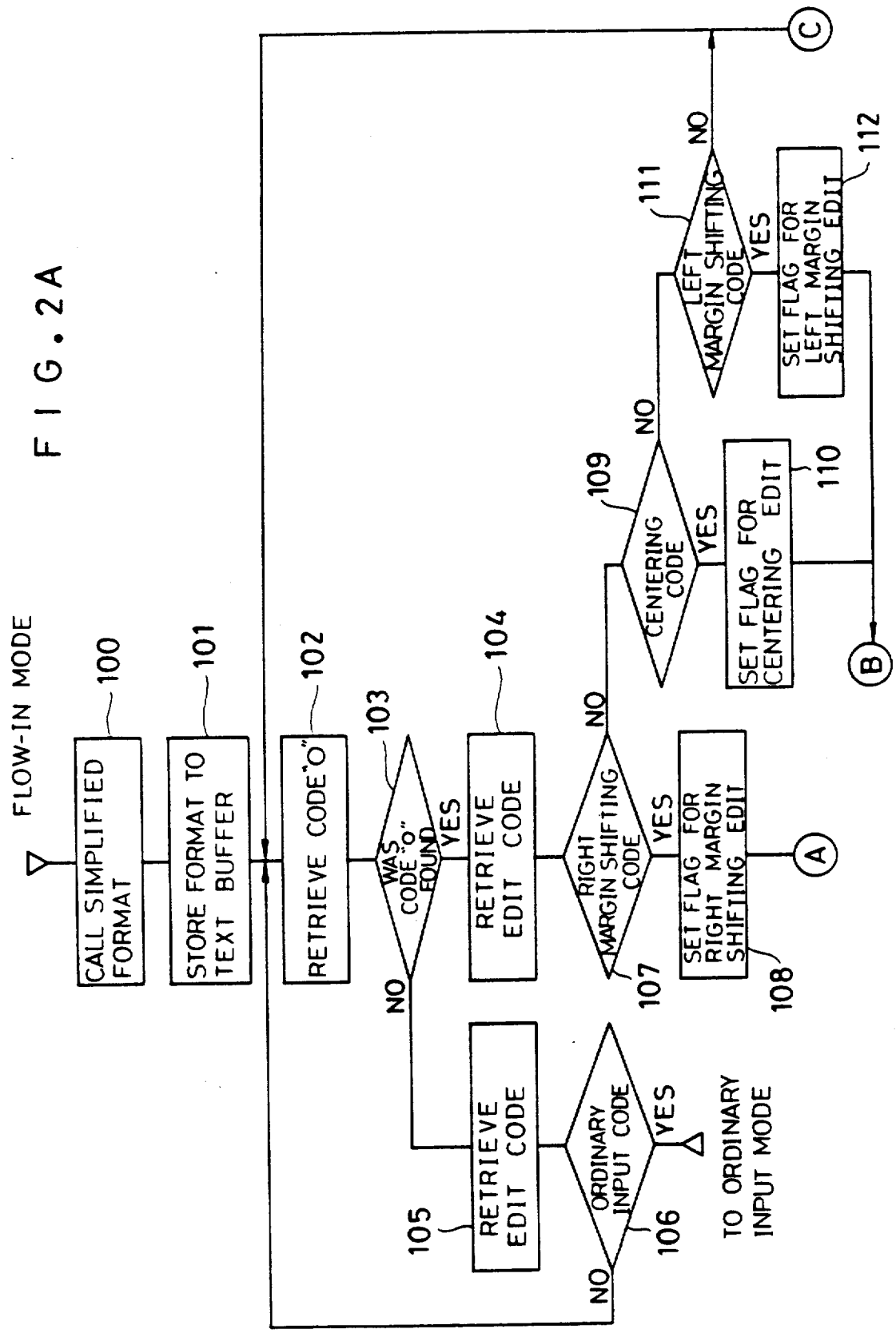

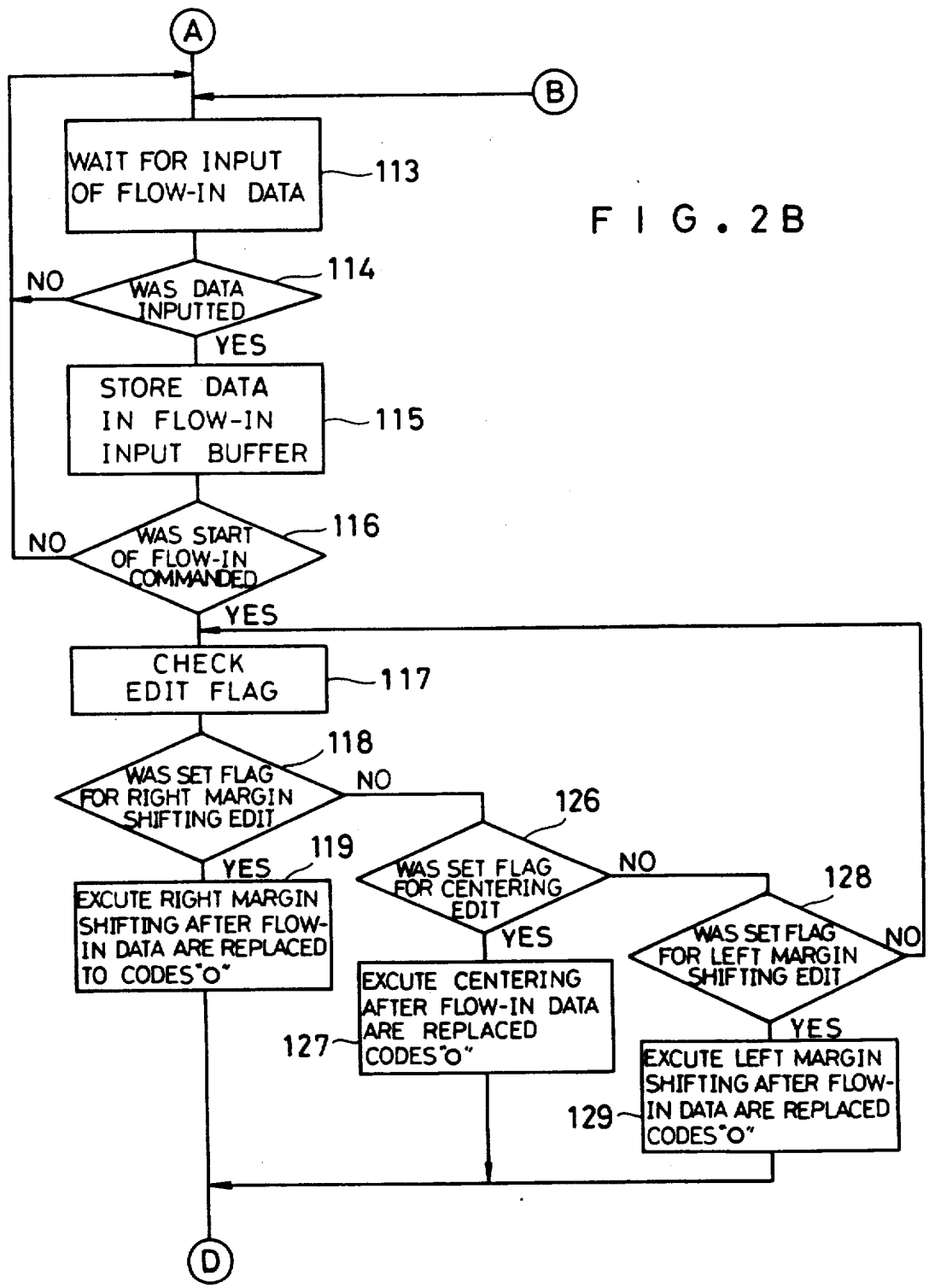

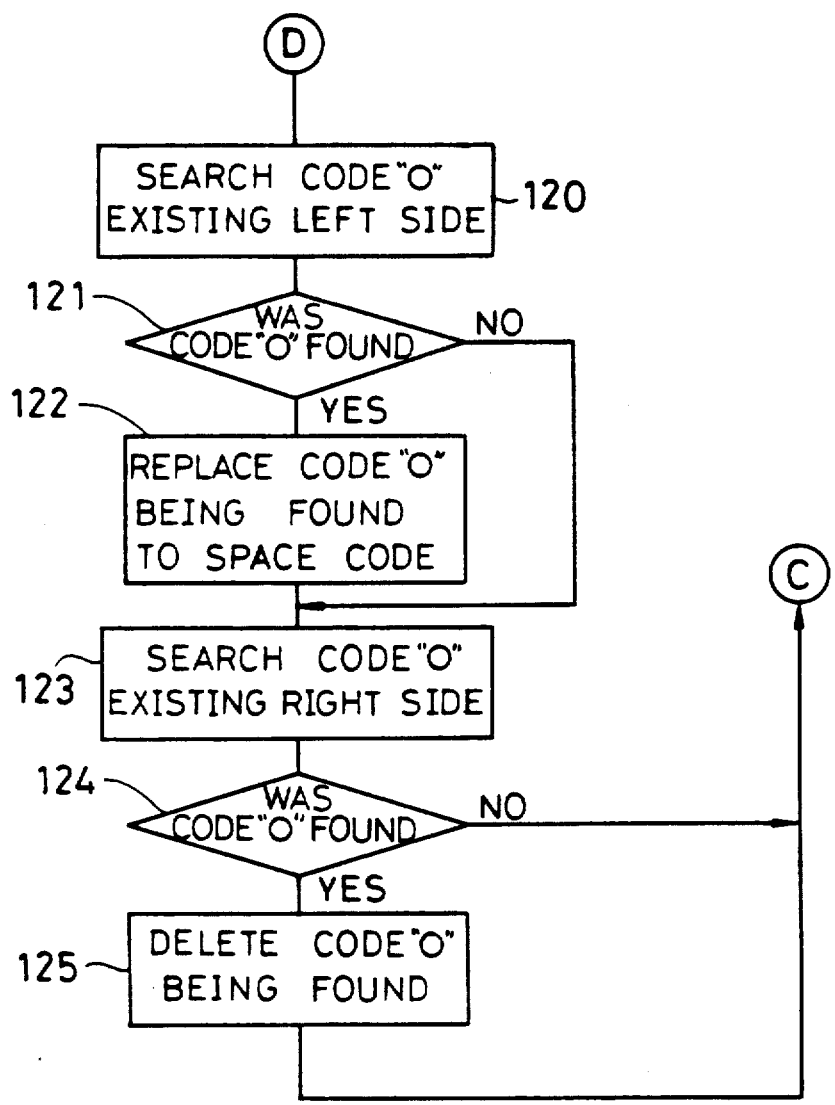

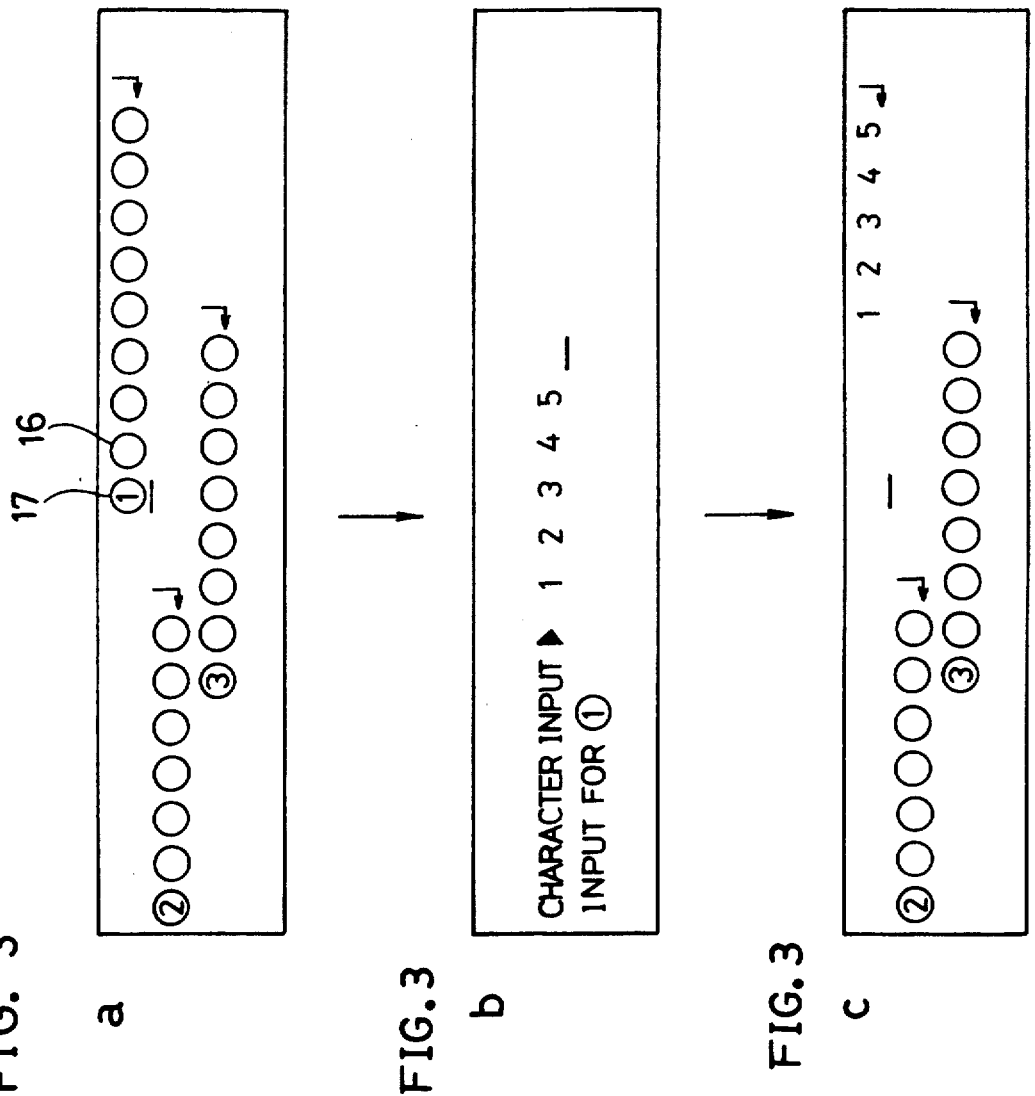

WORD PROCESSING APPARATUS

BACKGROUND OF THE INVENTION

1. Field of the Invention

The present invention relates to a word processing apparatus such as Japanese, English language or other language or word processors or personal computers and more particularly to a word processing apparatus capable of inputting characters into fixed format text. 2. Description of the Prior Art Conventional word processing apparatuses of this type are known. They have functions for inputting and registering fixed formats composed by "O", "f" or the other particular symbols in place of names and addresses. They function to call the registered fixed format texts and replacing particular symbols with inputted characters to accomplish the fixed format text when they are used. If there is a necessity of shifting a format as a name to the right end, an operator execute right margin shifting using an editing function after finishing replacement.

However, since editing operations such as right margin shifting, centering and the like become clear when the fixed format is composed, if the operator accomplishes right margin shifting and other editing each time as necessary after finishing replacement as mentioned above, problems of operations became complicated and portions requiring edit processing is left without editing occurring.

Moreover, in fixed format text input mode of the above mentioned word processing apparatus, the input mode will not automatically release while characters are inputted until the end of the format where there are no more symbols to input characters. Therefore it is necessary to release the mode by operating the release key each time when the operator wants to input between lines of the fixed format text in the ordinary text producing mode.

Furthermore, if character numbers to be inputted are less than the number of particular symbols set and registered in a line of a fixed format text and at least one particular symbol is not inputted character, the particular symbol without character inputted is left as that is in the fixed format text, or replaced by a space and left in the fixed format text. When particular symbols are left in the fixed format text and the fixed format text is printed out, particular symbols will be printed out on a paper as this causes inconvenience. In order to delete the remains of the particular symbols, it is necessary to execute batch deleting by an edit functions or to delete symbols one by one.

Moreover, in the above word processing apparatus, when a line exists, which is not needed, inputting characters in fixed format text input mode and characters are not inputted in the line, the line will left as particular symbols within the fixed format text and if the fixed format text is printed out in this state, the particular symbols are printed out as they are. Therefore, in order to delete unnecessary lines, it is necessary to switch over to ordinary text producing mode and to delete superflows lines by the function of partial deleting. This causes complicated key operation.

The present invention has been devised in view of the aforesaid problems. It is an object thereof to provide a word processing apparatus wherein at least an edit symbol, indicating edit processing content, is added to particular symbols being replaced characters and characters replaced by the edit symbols are edit controlled automatically when particular symbols with edit symbol are replaced with characters.

SUMMARY OF THE INVENTION

The present invention relates to a word processing apparatus comprising key input means, display means for displaying data, first memory means for storing text data inputted from the key input means, second memory means for storing simplified format composed of at least an edit symbol and a series of particular symbols, read-out means for reading out the simplified format stored in the second memory means and displaying it on the display means, retrieval means for retrieving the series of particular symbols and the edit symbol in the simplified format read out by the read-out means, replacing means for replacing the series of particular symbols retrieved by the retrieval means with characters inputted by the key input means, edit means for editing characters replaced by the replacing means according to the edit symbol and displaying it on the display means and storage means for storing the simplified format replaced and edited into the first memory means.

The apparatus according to the present invention is provided with function for editing automatically the simplified format inputted characters by at least an edit symbol when characters are inputted into a simplified format composed of at least an edit symbol and particular symbols (represents as "flow-in symbols" hereafter), this apparatus can provide an advantage of storing text as edited without editing by another key operation after inputting characters into the flow-in symbols.

In the present invention, edit symbols mean those indicating text edit functions a right margin shifting left margin shifting of lines inputted with characters, and placing desired several characters in the center of the text (centering) and so on. Edit symbols may include these for releasing flow-in mode, i.e., mode in which characters are inputted into particular symbols in simplified format and returning to ordinary character input mode. And for instance, an edit symbol will be added to a series of flow-in characters composing a line and set in a desired location of a simplified format as for flow-in mode releasing symbol.

It is desirable to select "O", "f" or other not frequently used symbols for flow-in symbols.

In the word processing apparatus according to the present invention, edit symbol in a simplified format may be set in a desired position in the simplified format and be composed of symbols for indicating flow-in mode releasing and the apparatus further may include release means for releasing the flow-in mode when the edit symbol is retrieved by a retrieval means.

Moreover, the apparatus may include symbol processing means for replacing the particular symbols remaining on the left of characters replaced by the replacing means with spaces, executing edit operations which delete the particular symbols remaining on the right of the characters replaced and displaying the simplified format edited on a display unit.

Furthermore, the apparatus may include line delete means for editing in a way to delete a certain lines when a particular key of the key input means which indicates to start flow-in without operation for inputting character of the input means for a series of particular symbols constituting the line of the simplified format.

The addition of the above means should improve edit functions and make the apparatus more useful.

BRIEF DESCRIPTION OF THE DRAWINGS

FIG. 1 is a block diagram showing the configuration of an embodiment of the present invention, FIGS. 2A, 2B and 2C are flow charts showing operations of the embodiment in the present invention, and FIG. 3 is a screen configuration diagram showing display screens scrolled step by step from flow-in input to the input termination of the embodiment in the present invention.

DETAILED DESCRIPTION OF THE PREFERRED EMBODIMENT

Key input means in the present invention usually comprises a keyboard having alphabetical keys or alphabet/kana keys for inputting Japanese, numeral keys and a plurality of function keys, an interface with a microcomputer and control programs. Arrangements of respective keys on the keyboard may be those known in the art, or in the Japanese version, may be arranged in Japanese alphabetical order (kana).

Display means is constituted by, for example, a CRT, liquid crystal display panel, its driving circuit and interface with a microcomputer.

Reading out means, retrieving means, replacing means, editing means and storing means may be constituted by a microcomputer and control programs.

FIG. 1 is a block diagram showing the configuration of the embodiment of the present invention, numeral 11 denotes a keyboard including a plurality of function keys and alphabet/kana (character) keys to input characters. Numeral 12 denotes a central processing unit comprising for instance 8 bits or 16 bits microcomputer, processing data inputted from the keyboard 11, and transporting and receiving data to and from a display unit 13, a storage unit 14 and a print unit 15. The display unit 13 may be a CRT or liquid crystal display device. The storage unit 14 includes a simplified format buffer 14a storing simplified format (fixed format), a text buffer 14b storing text data wherein flow-in symbols (mark) have been replaced with characters and edited and a flow-in input buffer 14c storing simplified format stored in the simplified format buffer 14a during replacement and edit. The terminology "Flow-in input" means a function for inputting desired characters as necessary into flow-in symbols pre-set in a simplified format in order to produce text data.

The printer unit 15 which can be a thermal transcirbe printer or dot impact printer, prints out text produced, etc., onto print paper.

Operations of the preferred embodiment will be described referring to FIGS. 2 and 3.

FIGS. 2A, 2B and 2C are flow charts illustrating operations of the preferred embodiment.

First, when a flow-in mode starts up, the central processing unit 12 calls a simplified format as shown in FIG. 3(a) from the simplified format buffer 14a and displays it on the display unit 13 (step 100). The simplified format consists of ◯ code which is flow-in symbols 16, and edit symbol (code) 17 displayed at the head of a series of ◯ codes. Edit symbol is represented as ① for "right margin shifting", ② for "left margin shifting" or ③ for "centering" respectively. The simplified format called out is stored in the text buffer 14b (step 101) and the flow-in symbols 16 will be retrieved (step 102). When retrieval result is judged (step 103), if flow-in symbols 16 exist, then edit code 17 will be retrieved (step 104). If flow-in symbols are not found in step 103, the edit code for releasing flow-in mode. i.e., an ordinary input code, will be retrieved among edit codes 17 (step 105), and if the ordinary input code exists (step 106), the mode will be switched over to the ordinary input mode automatically. In other words, if the ordinary input code is set at the desired location of a simplified format, it is possible to input text, etc., in the ordinary input mode from that location.

If the edit code 17 is retrieved in step 104, it will be judged whether the edit code 17 means "right margin shifting" (step 107) and if it means "right margin shifting", a right margin shifting edit flag will be set (step 108). In step 107, if it is not the "right margin shifting" code, then it will be judged whether the code means "centering" (step 109) and when it is "centering" code, a centering edit flag will be set (step 110). In step 109, if the code is not the "centering" code, then it will be judged whether it means "left margin shifting" (step 111) and when it is the "left margin shifting" code, a left margin shifting edit flag will be set (step 112) and when if it is not "left margin shifting" code, then it returns to step 102.

After one of the flags is set, the central processing unit 12 waits for flow-in data input from the keyboard 11 (step 113). Suppose the "right margin shifting" code is retrieved as edit code 17. If the flow-in data is inputted in flow-in data wait state (step 114), the flow-in data inputted will be displayed on the display unit 13 as shown in FIG. 3(b), the flow-in data will be stored in the flow-in input buffer 14c (step 115) and it will be judged whether flow-in start is commanded (step 116). Flow-in start can be executed by operating for instance, an execution key of the keyboard 11. If flow-in start is commanded, in other words if an execution key is depressed, the edit flag will be checked (step 117), and thereby judging whether flag for right margin shifting edit is set (step 118). If the flag for right margin shifting edit is set, a series of flow-in symbols will be replaced with flow-in data as input characters or others, then the right margin shifting is executed (step 119) and the result is displayed on display unit 13 as illustrated in FIG. 3(c).

Next, the flow-in symbol 16 is searched in the left side or the series of flow-in symbols replaced and shifted to right margin (step 120) and search result will be judged (step 121), and if the flow-in symbol 16 is found in the left side, the flow-in symbols 16 will be replaced with "space" code (step 122). In other words, suppose a series of 8 flow-in symbols, when 5 characters are inputted and thereafter editing of the "right margin shifting" is executed, flow-in symbols not replaced with character exist in the left of 5 characters inputted, but these will be replaced by the "space" code and the flow-in symbols not replaced with characters will not be printed out when the simplified format is printed out.

Thereafter, contrary to what is mentioned above, the flow-in symbol 16 in the right side is searched (step 123) and the search results is judged (step 124). Since the flow-in symbol does not remain in the right side after "right margin shifting" edit processing, it will return to step 102 to retrieve another following flow-in symbol. In step 124, if flow-in symbols are found in the right side, the flow-in symbols 15 remaining after replacement, i.e., after flow-in input termination (settlement) will be deleted. In other words, if "centering" code is found in step 109, then the steps 110-117 will be executed and setting state of the flag for right margin shifting edit will be judged in step 118, however, as the flag for right margin shifting edit is not set, then it will be judged whether a flag for centering edit is set (step 126). If the flag for centering edit is judged to be set, a series of flow-in symbols will be replaced with the flow-in data, thereafter centering is executed (step 127).

After accomplishing centering in this way, if the number of flow-in symbols being set is less than that of characters to be inputted, flow-in symbols will be left on the right and left of characters inputted, however, as it was mentioned above, the flow-in symbols being left not replaced will be replaced with the space codes automatically and, at the same time, deleted by steps 120 to 125 after execution of step 127.

The edit flag is checked in step 117, each of flags for right margin shifting and centering edit is judged being not set and a flag for left margin shifting edit is judged set (step 128), replacement and left margin shifting process will be done as in "right margin shifting" or "centering" (step 129).

The simplified format produced by replacing flow-in symbols with characters and edited by respective edit codes will be stored in the text buffer 14b as same as texts inputted in the ordinary input mode. On the other hand, if flow-in start command is given without inputting data into flow-in symbols, they will be replaced with "space" code or the entire line will be deleted by deleting in steps 120 to 125.

While description is given to the typical edit codes like as "right margin shifting", "centering" or "left margin shifting" of the embodiment, these codes may designates the combined "centering" and "underline", "double width", "equal allocation" or other edit functions.

Moreover, simplified formats may be those set on mask ROM or the like, those which can be set arbitrarily by the user or those preset which the user can modify as necessary.

Furthermore, as shown in the embodiment, simplified formats may comprise fixed form text and characters which will not be modified in addition to those composed of flow-in symbols and edit codes.

According to the present invention, since characters or the like inputted by flow-in in simplified format mode can be edited without operation of function keys or the like, key operation becomes easier and more useful On the other hand, since the flow-in input mode is released automatically according to the edit symbol indicating flow-in mode release when characters in inputted into a simplified format in flow-in mode, sentences other than simplified format can be produced arbitrarily in the simplified format, making interlinear editing of sentences including simplified format easier.

Moreover, as flow-in symbols without character inputting in simplified format can be replaced with space and, at the same time, deleted without operation of function keys or the like, making the key operation easier. This feature prevents miss operations which would print out surplus characters (flow-in symbols) by error.

In addition to that, as unnecessary lines in simplified format can be deleted line by line without changing input mode, key operation for deleting becomes easier.

What is claimed is:

1. A word processing apparatus comprising:
   key input means for inputting characters;
   a central processing unit connected to said key input means;
   display means for displaying data, said display means connected to said central processing unit;
   first memory means for storing characters inputted from the key input means, said first memory means connected to said central processing unit;
   second memory means for storing a simplified format including at least one edit symbol and a series of particular symbols, said second memory means connected to said central processing unit;
   said central processing unit including,
   (a) read-out means for reading out and subsequently displaying the series of particular symbols of the simplified format stored in the second memory means on the display means,
   (b) retrieval means for retrieving at least one edit symbol of the simplified format stored in said second memory means,
   (c) replacing means for replacing at least one of the series of particular symbols with characters inputted by the key input means, and
   (d) edit means for editing, by using at least one edit symbol the characters provided by the replacing means and displaying an edited result on the display means; and
   storage means connected to the central processing unit, for storing the simplified format from the second memory means after operation of the replacing and editing means.

2. The word processing apparatus of claim 1 wherein when the symbols of the simplified format are read out by the read out means edit symbols will be retrieved by the retrieval means and placed in front of the symbols on the display means and when no symbols of the simplified format are read by the read out means, edit symbols indicating an ordinary input code will be retrieved.

3. The apparatus of claim 2 further including means for switching for fetching different edit symbols.

4. The apparatus of claim 3, wherein said means for switching is automatic.

5. The word processing apparatus of claim 1 further including in the central processing unit;
   (e) symbol processing replacement means for replacing with a space particular flow in characters remaining to the left of characters on the display means replaced by the replacing means, and
   (f) executing means for deleting particular symbols remaining to the right of replaced characters on the display means.

6. The word processing apparatus of claim 1 further including in the central processing unit,
   (g) delete means for editing by deleting a certain line when a particular key of the key input means is operated without changing an input mode of the word processor.

* * * * *